(12) United States Patent
Kamikawa et al.

(10) Patent No.: US 7,723,540 B2
(45) Date of Patent: May 25, 2010

(54) METHOD AND APPARATUS FOR PRODUCING POLYHYDROXY CARBOXYLIC ACID

(75) Inventors: Masayuki Kamikawa, Hitachinaka (JP); Toshiaki Matsuo, Mito (JP); Kenichiro Oka, Hitachi (JP); Naruyasu Okamoto, Tokyo (JP); Ryuji Kaziya, Yokohama (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 0 days.

(21) Appl. No.: 11/770,165

(22) Filed: Jun. 28, 2007

(65) Prior Publication Data

US 2008/0004469 A1 Jan. 3, 2008

(30) Foreign Application Priority Data

Jun. 30, 2006 (JP) ............................. 2006-180647

(51) Int. Cl.
*C07C 59/08* (2006.01)
*C07C 59/10* (2006.01)

(52) U.S. Cl. ...................... 562/589; 562/515
(58) Field of Classification Search .................. None
See application file for complete search history.

(56) References Cited

U.S. PATENT DOCUMENTS 6,313,319 B1 * 11/2001 Ohara et al. ............... 549/274

FOREIGN PATENT DOCUMENTS

| JP | 8-333359 | 12/1996 |
|---|---|---|
| JP | 10-168077 | 6/1998 |
| JP | 11-217425 | 8/1999 |
| JP | 2005-314503 | 11/2005 |
| WO | WO 93/02075 | 2/1993 |

* cited by examiner

*Primary Examiner*—Daniel M Sullivan
*Assistant Examiner*—Yevegeny Valenrod
(74) *Attorney, Agent, or Firm*—Brundidge & Stanger, P.C.

(57) ABSTRACT

The object is to provide a method and apparatus for producing a polyhydroxy carboxylic acid according to which an annular dimer can be efficiently obtained in the production of polyhydroxy carboxylic acid which is small in distribution breadth of molecular weight in depolymerization and opening ring polymerization steps. There are provided a depolymerization device 11 which depolymerizes hydroxy carboxylic acid or a polycondensate thereof into an annular dimer, a upper distillation column 13 which condenses the annular dimer vaporized in the depolymerization device 11, and lower distillation column 12 which refluxes the annular dimer and is provided between the depolymerization device 11 and the upper distillation column 13, said depolymerization device 11 having a polycondensate feed opening 54 and an annular dimer discharge opening 55 which are provided at a casing 50, a liquid film being formed inside the casing 50 and heated by a heating part.

4 Claims, 3 Drawing Sheets

METHOD AND APPARATUS FOR PRODUCING POLYHYDROXY CARBOXYLIC ACID

FIELD OF THE INVENTION

The present invention relates to a method and apparatus suitable for obtaining annular dimers such as lactide by concentrating and polycondensing hydroxy carboxylic acids such as lactic acid, and then depolymerizing the polycondensation product.

BACKGROUND OF THE INVENTION

Conventional apparatuses are, for example, those which are disclosed in Patent Document 1 and Patent Document 2. According to these apparatuses, a polylactic acid is produced by concentrating lactic acid to reduce the content of water and then polycondensing the concentrated lactic acid to produce a lactic acid oligomer, once depolymerizing the lactic acid oligomer with addition of a catalyst such as antimony oxide, thereby to obtain an annular dimer (lactide), if necessary, carrying out purification by crystallization or the like, and thereafter opening ring polymerizing the lactide with addition of a catalyst such as tin octylate to produce a polylactic acid.

Patent Document 1 discloses an apparatus including a lactide-forming reactor which depolymerises lactic acid oligomer and a condenser which condenses evaporated lactide, with a reflux condenser being provided between the lactide-forming reactor and the condenser.

Patent Document 1: JP-A-11-217425

Patent Document 2: JP-A-10-168077

BRIEF SUMMARY OF THE INVENTION

In the conventional technologies of Patent Document 1 and Patent Document 2, lactide, catalyst and oligomer coexist between the lactide-forming reactor and the reflux condenser, and hence there is a problem that the oligomer acts as a polymerization initiator to initiate a polymerization reaction and the resulting polymer clogs the piping. In case the catalyst and the oligomer are refluxed from the reflux condenser to the outlet of the lactide-forming reactor, the polymerization reaction more readily takes place to increase the possibility of clogging of piping.

Further problem is that the oligomer discharged together with lactide from the lactide-forming reactor is reduced in molecular weight due to the depolymerization reaction and is desirably re-polycondensed to increase the molecular weight, but since the oligomer refluxed from the reflux condenser contains catalyst, depolymerization reaction proceeds by heating and reducing the pressure, and hence cannot be re-polycondensed in the polycondensation reaction vessel.

The object of the present invention is to provide a method and apparatus for producing a polyhydroxy carboxylic acid with narrow breadth of molecular weight distribution in depolymerization and opening ring polymerization steps, wherein an annular dimer can be efficiently obtained.

For attaining the above object, according to the method and apparatus for producing polylactic acid of the present invention, a lower distillation column for separating an annular dimer and a polycondensate and for refluxing the polycondensate is provided between a condenser and a depolymerization device using a device for making the polycondensate into a thin layer by external force, and the polycondensate scattered together with the annular dimer from the depolymerization device is separated from the annular dimer and then is refluxed.

Other objects, features and advantages of the invention will become apparent from the following description of the embodiments of the invention taken in conjunction with the accompanying drawings.

DESCRIPTION OF REFERENCE NUMERALS

1—lactic acid feeding device, 2, 4, 6, 8, 10, 14, 16—liquid feeding pump, 3—lactic acid concentration device, 5—concentrated lactic acid buffer tank, 7—lactic acid polycondensation device, 9—oligomer buffer tank, 11—depolymerization device, 12—lower distillation column (reflux condenser), 13—upper distillation column (lactide condenser), 15—lactide purification device, 17—opening ring polymerization device, 18, 21—distillation column (refluxing device), 19, 22, 24—cooling device, 20, 23, 26—vacuum pump, 25—impurity cooler, 1'—lactic acid, 3'—concentrated lactic acid, 7', 12'—oligomer, 11', 16'—catalyst, 17'—polylactic acid, 19', 22', 24', 25'—cooling water, 20', 23', 26'—draining.

DETAILED DESCRIPTION OF THE INVENTION

Figure 1:
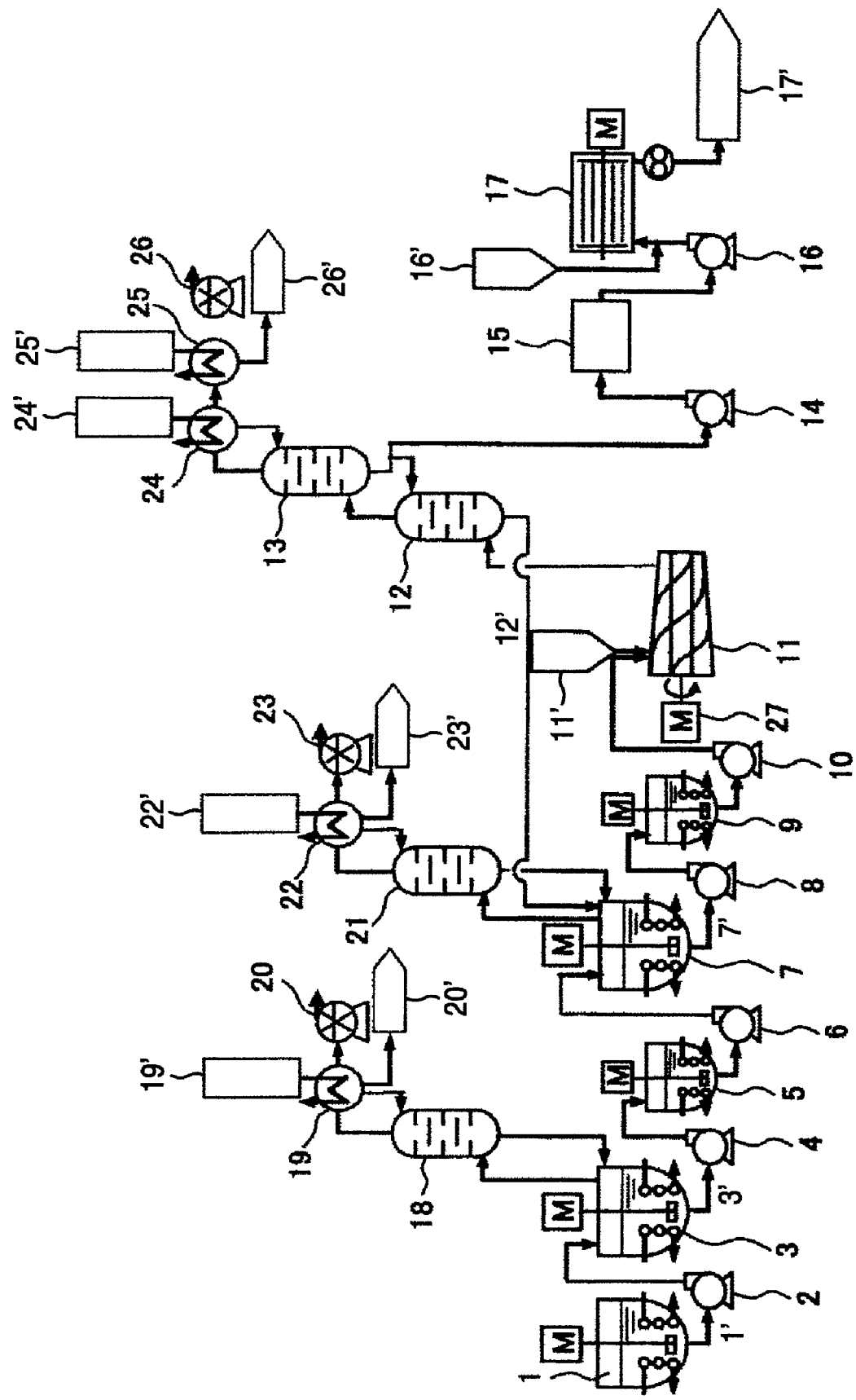
FIG. 1 is a block diagram of the apparatus for producing polyhydroxy carboxylic acid or polylactic acid according to one embodiment of the present invention.
Figure 2:
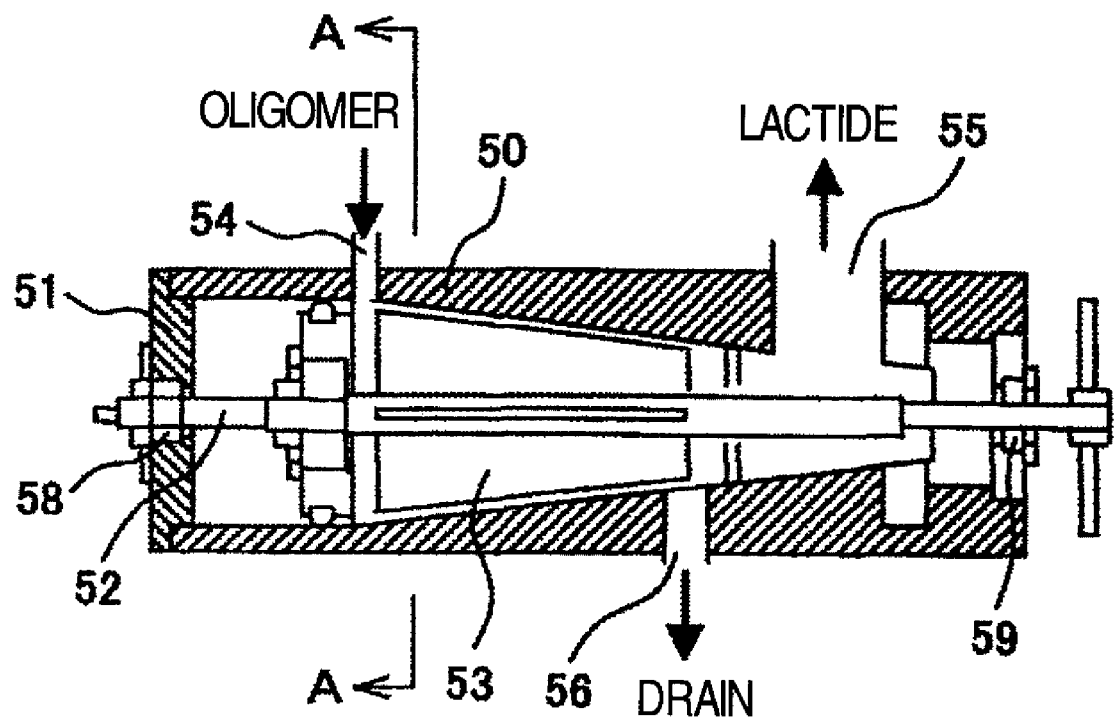
FIG. 2 is a longitudinal sectional view of the depolymerization device in the embodiment of the present invention.
Figure 3:
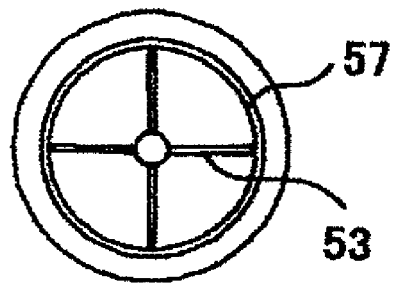
FIG. 3 is a section taken on the line A-A of FIG. 2.

One embodiment of the present invention will be explained referring to FIG. 1 to FIG. 3. FIG. 1 is a block diagram of an apparatus for producing polylactic acid, FIG. 2 is a longitudinal section which shows details of a depolymerization device, and FIG. 3 is a section taken on the line A-A of FIG. 2.

This embodiment relates to production of a polyhydroxy carboxylic acid from a hydroxy carboxylic acid, particularly, production of polylactic acid from lactic acid. In the case of polyhydroxy carboxylic acid, water contained in hydroxy carboxylic acid which is a starting material is evaporated by a concentration device to produce concentrated hydroxy carboxylic acid, the concentrated hydroxy carboxylic acid is polycondensed in a polycondensation device to produce a polycondensate, the resulting polycondensate is depolymerized in a depolymerization device under reduced pressure to produce a hydroxy carboxylic acid annular dimer, and thereafter the purified hydroxy carboxylic acid annular dimer is depolymerized, thereby to produce polyhydroxy carboxylic acid. In the case of polylactic acid, a fatty acid polyester is produced from lactic acid as a starting material, and in the apparatus for producing polylactic acid, water contained in lactic acid is evaporated by a lactic acid concentration device to produce concentrated lactic acid, the concentrated lactic acid is polycondensed in a lactic acid polycondensation device to produce a lactic acid oligomer, the resulting lactic acid oligomer is depolymerized in a depolymerization device under reduced pressure to produce lactide, and then the purified lactide is depolymerized to produce polylactic acid.

The apparatus for producing polylactic acid is constructed as shown in FIG. 1. To a lactic acid feeding device 1, a lactic acid concentration device 3 is connected through a liquid feeding pump 2, and lactic acid is fed to lactic acid concentration device 3 from lactic acid feeding device 1 by liquid feeding pump 2.

In the lactic acid concentration device 3, water contained in lactic acid is evaporated by heating. The heating is carried out at 120-150° C. while passing nitrogen gas.

Lactic acid as a monomer sometimes contains about 10-15% of water (hereinafter referred to as "free water") as an impurity, and in the concentration step, this free water is removed in order to allow the esterification treatment between monomers to readily occur. In this concentration step, if necessary, removal of water is carried out under reduced pressure using a vacuum pump, etc. Preferably, water contained in lactic acid is removed as much as possible by heating.

By this lactic acid concentration reaction, water and lactic acid are vaporized, these gases enter into a distillation column 18, and lactic acid is removed from the gas and refluxed to lactic acid concentration device 3 to produce concentrated lactic acid. The water vapor separated from lactic acid is fed to cooling device 19 from distillation column (refluxing device) 18 and cooled by cooling water to be liquefied and discharged. The gas from which water is removed is reduced in pressure to atmospheric pressure by vacuum pump 20 and discharged into air.

A concentrated lactic acid buffer tank 5 is connected to the lactic acid concentration device 3 through liquid feeding pump 4, and the concentrated lactic acid produced in the lactic acid concentration device 3 is fed to the concentrated lactic acid buffer tank 5 by the liquid feeding pump 4. The concentrated lactic acid buffer tank 5 is a tank for temporary reservoir of the concentrated lactic acid and is connected to a lactic acid polycondensation device 7 through a liquid feeding pump 6.

The concentrated lactic acid is fed to lactic acid polycondensation device 7 from concentrated lactic acid buffer tank 5 by liquid feeding pump 4. In the lactic acid polycondensation device 7, polycondensation reaction of lactic acid proceeds, and a lactic acid oligomer is produced by heating under reduced pressure, and water produced is evaporated. In this polycondensation step, water produced by the esterification reaction between monomers is vaporized and removed by heating at 120-250° C., preferably 170-200° C. in an environment reduced in pressure to 10 Torr or lower, preferably 1 Torr or lower by a vacuum pump or the like. The reduction of pressure in this polycondensation step is essential for proceeding the esterification reaction, being different from the reduction of pressure in the concentration step. By this polycondensation step, a lactic acid polycondensate (hereinafter referred to as "lactic acid oligomer" or merely as "oligomer") is produced from the monomers. The heat decomposition of lactic acid and lactic acid oligomer can be inhibited by shortening the heating time.

The lactic acid oligomers here mean those which include from dimers of glycolic acid to lactic acid polymers having a molecular weight of about 50,000 or less, and the molecular weight of the lactic acid oligomers obtained by the lactic acid polycondensation reaction is usually 1,000-10,000, preferably 3,000-5,000 in average molecular weight.

With respect to the lactic acid polycondensation reaction, if necessary, a catalyst for lactic acid polycondensation reaction may be added. As the catalyst, mention may be made of, for example, organotin catalysts (such as tin lactate, tin tartrate, tin dicaprylate, tin dilaurate, tin dipalmitate, tin distearate, tin dioleate, tin α-naphthoate, tin β-naphthoate and tin octylate) and powdered tin, etc.

In the lactic acid polycondensation reaction, there are produced, as a gas, water, lactic acid, lactic acid oligomer of low molecular weight and lactide produced due to decomposition of the oligomer. A distillation column 21, a cooling device 22, and a vacuum pump 23 are connected to the lactic acid polycondensation device 7, and the generated gas of lactide transfers to the direction of the vacuum pump 23 and enters into the distillation column 21, and lactic acid, lactic acid oligomer of low molecular weight and lactide are removed from the gas and refluxed to the lactic acid polycondensation device 7. The water vapor from which lactic acid, lactic acid oligomer of low molecule and lactide have been removed is cooled by cooling device 22 through which cooling water flows and becomes water and is drained. The gas from which water has been removed is discharged into the air from the vacuum pump 23.

An oligomer buffer tank 9 is connected to the lactic acid polycondensation device 7 through a liquid feeding pump 8, and the lactic acid oligomer produced in the lactic acid polycondensation device 7 is stored in the oligomer buffer tank 9 by the liquid feeding pump 8. To the oligomer buffer tank 9 is connected a depolymerization device 11 through a liquid feeding pump 10.

A depolymerization reaction of the lactic acid oligomer is allowed to proceed in the depolymerization device 11. In the depolymerization reaction, the pressure is reduced to 10 torr or lower by a pressure-reducing device such as a vacuum pump, and the lactic acid oligomer is contacted with a depolymerization catalyst such as antimony trioxide or tin octylate at 120-250° C., preferably 120-200° C. to produce gas of lactide (lactic acid annular dimer ester). The lactide here is an annular ester produced by dehydration of two molecules of water from two molecules of lactic acid.

In the depolymerization reaction, if necessary, there may be added a catalyst for depolymerization reaction as mentioned above. As the catalyst, there may be used, for example, metals selected from the group consisting of those of Groups IA, IIIA, IVA, IIB and VA of the periodic table or metal compounds thereof.

Those which belong to Group IA include, for example, hydroxides of alkali metals (e.g., sodium hydroxide, potassium hydroxide, lithium hydroxide, etc.), salts of alkali metals and weak acids (e.g., sodium lactate, sodium acetate, sodium carbonate, sodium octylate, sodium stearate, potassium lactate, potassium acetate, potassium carbonate, potassium octylate, etc.), alkoxides of alkali metals (e.g., sodium methoxide, potassium methoxide, sodium ethoxide, potassium ethoxide, etc.), and the like.

Those which belong to Group IIIA include, for example, aluminum ethoxide, aluminum isopropoxide, alumina, aluminum chloride, etc.

Those which belong to Group IVA include, for example, organotin catalysts (e.g., tin lactate, tin tartrate, tin dicaprylate, tin distearate, tin dioleate, tin α-naphthoate, tin β-naphthoate, tin octyate, etc.) and additionally powdered tin, tin oxide, halogenated tin, and the like.

Those which belong to Group IIB include, for example, zinc powder, halogenated zinc, zinc oxide, organozinc compounds, etc.

Those which belong to Group IVB include, for example, titanium compounds such as tetrapropyl titanate, zirconium compounds such as zirconium isopropoxide, and the like.

Among them, preferred are tin compounds such as tin octylate or antimony compounds such as antimony trioxide.

The amount of these catalysts is about 0.01-20% by weight, preferably about 0.05-15% by weight, more preferably about 0.1-10% by weight based on glycolic acid oligomer.

The depolymerization device 11 has at least a reactor, a lactic acid oligomer feed opening, and a lactide discharge opening. Furthermore, usually a temperature sensor is provided to monitor the temperature. The reactor may be either of vertical type or horizontal type, and there may be used a device of making the oligomer into a thin film by using an external force, such as the centrifugal flow thin film evaporator as shown in FIG. 2 and FIG. 3.

As shown, for example, in FIG. 2 and FIG. 3, the centrifugal flow thin film evaporator is comprised of a blade 53 fixed to a rotating shaft 52 linked to a driving device 27, a cover 51 provided with a bearing device 58 for supporting the rotating shaft 52 by bearing, a bearing device 59 for supporting another end side of the rotating shaft 52 by bearing, and a casing 50 having an inner wall parallel with the outer shape of the rotating blade 53. An oligomer feed opening 54 is formed at the casing 50 on the side of larger outer diameter of the blade 53, a lactide discharge opening 55 is formed at the upper part of the casing 50 on the side of smaller outer diameter of the blade 53, and a drain opening 56 is formed at the lower part of the casing 50 on the side of smaller outer diameter of the blade 53. In this embodiment, the shape of the blade 53 is such that the outer diameter of the blade 53 gradually decreases toward the side of the bearing device 59.

In many cases, the blade 53 is a plate-like blade provided radially from the rotating shaft, and, in some case, the blade is used in the form of a screw by giving a tortion. In the centrifugal flow thin film evaporator, the rotating shaft may be provided horizontally or vertically to the ground or at an angle with the ground which is between horizontal and vertical.

For heating the reactor, there may be employed, for example, a method of providing a jacket of heat medium in the outer peripheral part of the reactor and heating the reaction solution by heat transfer through the wall surface, a method of heating by heat transfer by passing heat medium through the inside of rotating shaft of the blade, and the like, and these may be used in optional combination.

In many cases, the lactide produced is usually gaseous in the environment of the above-mentioned depolymerization step, and is recovered by cooling and condensation. In this case, if the concentration reaction and polycondensation reaction are insufficient, water incorporates into the lactide in some case. Water incorporated reacts with a part of lactide and returns to a straight chain monomer, etc., which causes hindrance of increase of polymerization degree due to the effect of carboxyl group of acid catalyst in the step of polymerization of polylactic acid by opening ring polymerization. Therefore, it is necessary to sufficiently carry out concentration and polycondensation of lactic acid which is a starting material to reduce the amount of water contained in lactide after depolymerization as much as possible.

Since in the depolymerization device 11 in this embodiment, the blade is rotated in a fixed casing to give centrifugal force to make the oligomer into thin layers, contact area of the oligomer and the gas face can be increased and evaporation of lactide produced by the depolymerization reaction can be accelerated, and thus the depolymerization reaction of the oligomer can be accelerated.

As mentioned above, in the centrifugal flow thin film evaporator, the oligomer fed in the apparatus is provided in the casing in which a rotator provided with a blade is fixed, and is allowed to touch to the inside of the casing by the centrifugal force of the rotating blade, thereby forming a liquid film, and evaporation is promoted by heating from the outer surface of the casing.

The centrifugal flow thin film evaporator in this embodiment has merits that the plant scale can be made smaller, and the thickness of liquid film can be controlled by controlling the gap width between the blade and the casing and the number of rotation of the blade.

In the case of horizontal centrifugal flow thin film evaporator, catalyst is retained in the evaporator and the catalyst can be dispersed in the molten oligomer by driving of the rotating shaft and blade. Therefore, even when molten oligomer is continuously fed from one end of the evaporator, the retention amount thereof can be kept constant by adjusting the feed amount to such an amount corresponding to the discharge amount of the annular dimer vapor, and hence it is not necessarily needed to carry out continuous discharge from another end. With decrease of catalytic activity, when the retention amount increases due to the decrease of efficiency of the depolymerization reaction or accumulation of residue after depolymerization of the molten oligomer, the efficiency of the depolymerization reaction can be improved by discharging the liquid in the evaporator from drain opening 56 and introducing fresh catalyst into the apparatus, and restarting the operation.

The centrifugal flow thin film evaporator has the following advantages. First, it has a great evaporating ability and hence is suitable for treatment of high viscosity material. This is because liquid becomes a uniform thin film by the rotating blade and besides the liquid is vigorously stirred, and hence even a high viscosity material has a great heat transfer coefficient.

Next, since retention time is short, it is suitable for treatment of thermally unstable material. This is because the liquid is treated in the form of a thin film and concentrated to a preset concentration in a short time. Further, since vacuum evaporation is properly performed, it is suitable for treatment of thermally unstable materials and high-boiling point materials. This is because since the liquid is treated in the form of a thin film, the increase in boiling point is not caused by liquid head and evaporation can be performed at a boiling point under a degree of vacuum in the evaporator.

Moreover, scale does not deposit and continuous operation is possible, and hence it is suitable for treatment of high viscosity materials or slurry liquid. This is because the liquid is stirred by rotating blade and the heat transfer surface contacts with fresh liquid. Furthermore, since the droplets scattered by the rotating blade in the centrifugal flow thin film evaporator are hit and pushed back to the liquid film on the rotating blade by centrifugal force and absorbed therein, whereby the catalyst can be inhibited from being scattered as droplets and being discharged from the depolymerization device.

In this embodiment, since a centrifugal flow thin film evaporator is used as the depolymerization device 11 of oligomer, the temperature of the oligomer is apt to rise in a short time and the depolymerization reaction can be completed in several minutes to several ten minutes. Furthermore, the liquid film is thin, and hence the lactide produced very rapidly vaporizes. Therefore, there are less optical isomers produced by isomerization reaction of oligomer and less impurities produced by heat decomposition of oligomer, and, hence, lactide of high purity can be obtained. Thus, since amount of impurities which must be removed in the purification step is reduced, polylactic acid can be efficiently obtained.

The lactide discharge opening 55 of the depolymerization device 11 is connected to a lower distillation column 12, and the vapor containing lactide produced in the depolymerization device 11 is fed to the lower distillation column 12. The impurities such as oligomer contained in lactide are liquefied by properly controlling the cooling temperature of the lower distillation column 12, and the lactide vapor is passed and fed to an upper distillation column 13.

The lower distillation column 12 is preferably a surface condenser in which vapor and a refrigerant indirectly contact with each other with a metal tube therebetween. This is because if lactide and lactic acid oligomer disrectly contact with a refrigerant containing water, they decompose to produce an acid. The acid hinders progress of opening ring polymerization reaction as an acid catalyst and besides may cause corrosion of materials of the condenser and the like. When a refrigerant which is inert to lactide and lactic acid oligomer is used, it is necessary to sufficiently dry the refrigerant to reduce moisture content.

The separated lactic acid oligomer is condensed and liquefied, and then refluxed. In the liquid containing oligomer separated from lactide, in many cases, molecular weight of the oligomer becomes smaller by the depolymerization reaction. In order to improve the yield of lactide, it is desired that the oligomer of small molecular weight is again condensed to increase the molecular weight, and hence the liquid containing the low molecular weight oligomer separated from lactide is refluxed and again condensed.

As for the position to which the oligomer is returned, in this embodiment, it is returned to lactic acid polycondensation device 7. As the position to which the oligomer is returned, there are lactic acid concentration device 3, oligomer buffer tank 9, inlet of depolymerization device 11, etc. in addition to the concentrated lactic acid buffer tank 5 shown in FIG. 4. Furthermore, the lower distillation column may have multi-stages for separating the lactic acid oligomer depending on the molecular weight and then refluxing them. In this case, it is preferred to return the low molecular weight oligomer to at least one of the lactic acid concentration device, concentrated lactic acid buffer tank and lactic acid polycondensation device, and the high molecular weight oligomer to at least one of the lactic acid polycondensation device, lactic acid oligomer buffer tank and inlet of oligomer depolymerization device. The lactide passes through them is transferred to the upper distillation column. The lactide passing through here is transferred to upper distillation column.

Upper distillation column 13 is connected to the lower distillation column 12, and the separated gaseous lactide is sent to the upper distillation column 13 and cooled and condensed in the upper distillation column 13, and then fed to a lactide purification device 15 by a liquid feeding pump 14.

The upper distillation column 13 is preferably a surface condenser in which vapor and a refrigerant indirectly contact with each other with a metal tube therebetween. This is because if lactide directly contacts with a refrigerant containing water, it decomposes to produce an acid. The acid hinders progress of opening ring polymerization reaction as an acid catalyst, and besides may cause corrosion of materials of the condenser and the like. When a refrigerant which is inert to lactide is used, it is necessary to sufficiently dry the refrigerant to reduce moisture content.

A gas containing a large amount of water vapor separated from lactide enters into a cooling device 24, and lactic acid, low molecular lactic acid oligomer and lactide are removed from the gas and refluxed to the upper distillation column 13. The vapor which has not been condensed in the cooling device 24 enters into an impurity cooler 25, where it is condensed and liquefied. In many cases, the liquefied impurities are abandoned. The gas which has not been condensed in the impurity cooler 25 is released out of the system through the vacuum pump 26.

The lactide purification device 15 is connected to an opening ring polymerization device 17 through a liquid feeding pump 16, and the lactide purified in the lactide purification device 15 is transferred to the opening ring polymerization device 17 by the liquid feeding pump 16.

In the opening ring polymerization device 17, the opening ring polymerization reaction of lactide is carried out by contacting the lactide with an opening ring polymerization catalyst such as antimony trioxide or tin octylate, and a polymerization initiator such as 1-dodecanol at a temperature of usually 120-250° C., preferably 120-200° C. under a reduced pressure of 10 torr or lower in an inert gas atmosphere.

The opening ring polymerization device 17 has at least a reactor, a lactide feed opening and a polylactic acid discharge opening. Furthermore, usually a temperature sensor is provided to monitor the temperature. The reactor is not particularly limited, and can be vertical reactor, a horizontal reactor and a tank type reactor. Two or more reactors may be connected in series. As the agitating blade, there may be used a paddle blade, a turbine blade, an anchor blade, double-motion blades, a helical ribbon blade, or the like.

As the heating method in the reactor, for example, there are a method of heating the reaction solution by heat transfer from wall surface of the reactor by means of a jacket of heating medium provided at the outer peripheral part of the reactor, a method of heating the reaction solution by heat transfer through a heat transfer tube (coil) in the reactor, and others, and these may be optionally combined.

In the opening ring polymerization reaction, if necessary, a catalyst for depolymerization reaction may be added. As the catalyst, there may be used metals selected from the group consisting of those of Groups IA, IIIA, IVA, IIB and VA of the periodic table, or compounds of these metals.

Those which belong to Group IA include, for example, hydroxides of alkali metals (e.g., sodium hydroxide, potassium hydroxide, lithium hydroxide, etc.), salts of alkali metals and weak acids (e.g., sodium lactate, sodium acetate, sodium carbonate, sodium octylate, sodium stearate, potassium lactate, potassium acetate, potassium carbonate, potassium octylate, etc.), alkoxides of alkali metals (e.g., sodium methoxide, potassium methoxide, sodium ethoxide, potassium ethoxide, etc.), and the like.

Those which belong to Group IIIA include, for example, aluminum ethoxide, aluminum isopropoxide, alumina, aluminum chloride, etc.

Those which belong to Group IVA include, for example, organotin catalysts (e.g., tin lactate, tin tartrate, tin dicaprylate, tin distearate, tin dioleate, tin α-naphthoate, tin β-naphthoate, tin octyate, etc.) and, additionally, powdered tin, tin oxide, halogenated tin, and the like.

Those which belong to Group IIB include, for example, zinc powder, halogenated zinc, zinc oxide, organozinc compounds, etc.

Those which belong to Group IVB include, for example, titanium compounds such as tetrapropyl titanate, zirconium compounds such as zirconium isopropoxide, and the like.

Among them, preferred are tin compounds such as tin octylate or antimony compounds such as antimony trioxide.

The amount of these catalysts is about 1-2000 ppm, preferably about 5-1500 ppm, more preferably about 10-1000 ppm based on lactide.

In the opening ring polymerization reaction, if necessary, a polymerization initiator for depolymerization reaction may be added for the purpose of adjustment of molecular weight. An alcohol such as 1-dodecanol can be used as the polymerization initiator.

Polylactic acid is produced by the opening ring polymerization reaction as mentioned above. As one example, when concentration of the polymerization initiator was 700 ppm, the weight-average molecular weight of polylactic acid was about 200000.

Crude lactide was produced by the apparatus of this embodiment. The oligomer used in this experiment had an average molecular weight of 630. The retention time of oligomer in the depolymerization device 11 was 5 hours, thickness of the liquid film was 5 cm, and increase of optical isomerization rate in the depolymerization step was 0.9% in the case of the catalyst (tin 2-ethylhexanoate) concentration being 0.7 kg/m$^3$. Here, the retention time of the oligomer is defined to be a ratio of a feed flow rate of molten oligomer and a retention amount of molten oligomer in the depolymerization device 11 of oligomer when the feed flow rate of the molten oligomer and the flow rate of vapor condensate discharged from the depolymerization reactor are equal, and when the thickness of liquid film is stabilized. Furthermore, coloration of polylactic acid obtained by opening ring polymerization using the resulting lactide is 2.5 in terms of value b, and thus the influence of heat decomposition of lactide and oligomer in depolymerization can be said to be small.

EXAMPLES

Figure 4:
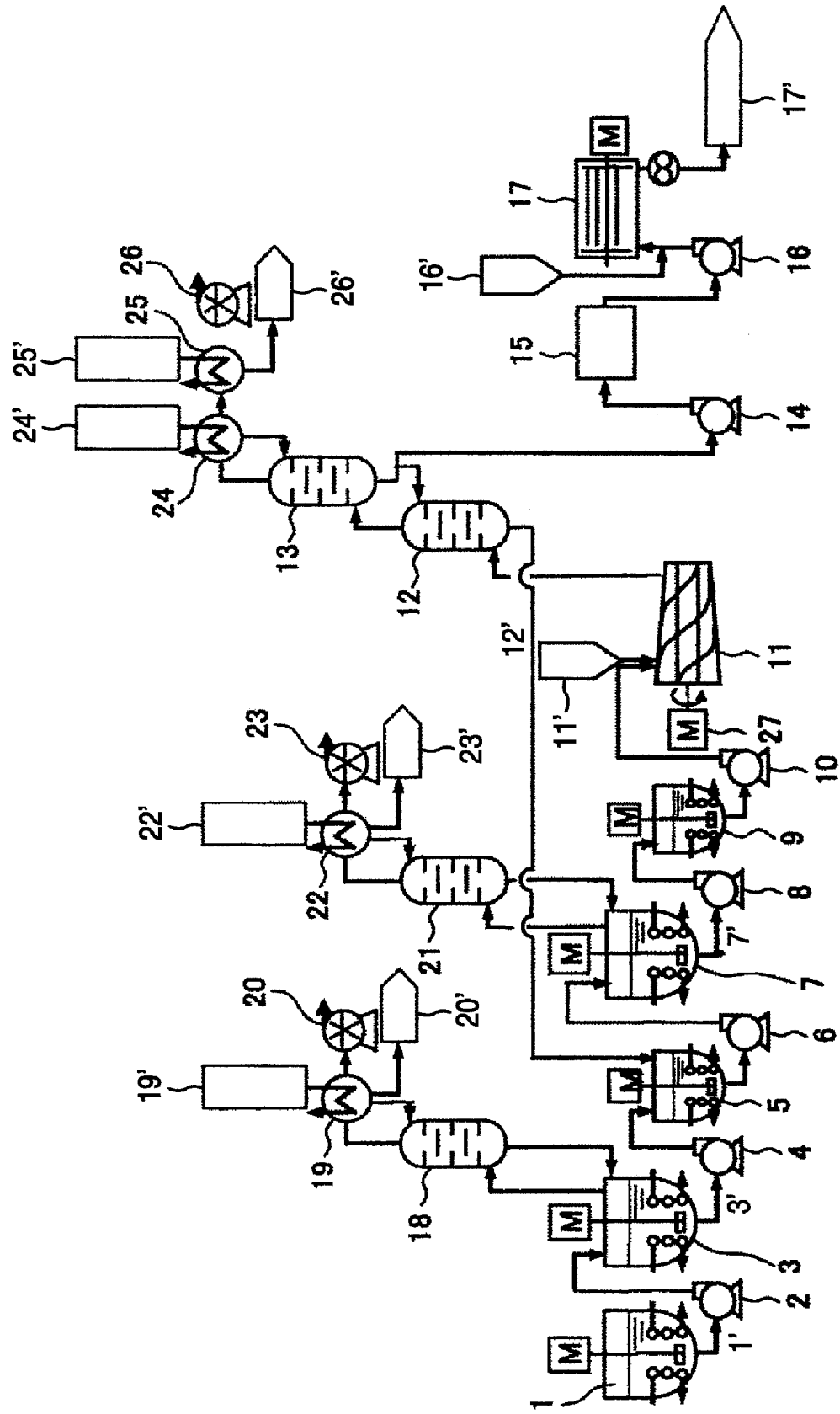
FIG. 4 is a block diagram of the apparatus for producing polyhydroxy carboxylic acid or polylactic acid according to another embodiment of the present invention.

Next, an example of the present invention will be explained referring to FIG. 4. The construction of this example is similar to that illustrated in FIG. 1, but in this example, oligomer is returned to a concentrated lactic acid buffer tank 5. Polylactic acid was produced using the apparatus for producing polylactic acid having a construction as shown in FIG. 4.

In lactic acid concentration device 3, water contained in lactic acid is evaporated by heating. The heating is carried out at 120-150° C. under passing of nitrogen gas. In the lactic acid concentration reaction, water and lactic acid are produced as gases. These gases enter into distillation column 18, and lactic acid is removed from the gases and refluxed to the lactic acid concentration device 3.

The concentrated lactic acid produced in the lactic acid concentration device 3 is sent to lactic acid polycondensation device 7 through concentrated lactic acid buffer tank 5. In the lactic acid polycondensation device 7, polycondensation reaction of lactic acid is allowed to proceed, and water produced is evaporated. The reaction is carried out at a temperature of 120-250° C. under a reduced pressure of 10 torr or lower. In the lactic acid polycondensation reaction, there are produced water, lactic acid, lactic acid oligomer of low molecular weight and lactide produced by the decomposition of the oligomer as gases. They transfer from the lactic acid polycondensation device 7 to vacuum pump 23. These gases enter into distillation column 21, and lactic acid, lactic acid oligomer of low molecular weight and lactide are removed from the gases and refluxed to the lactic acid polycondensation device 7.

The lactic acid oligomer produced in the lactic acid polycondensation device 7 is sent to depolymerization device 11. In the depolymerization device 11, depolymerization reaction of lactic acid oligomer is allowed to proceed. The reaction is carried out at a temperature of 120-250° C. under a reduced pressure of 10 torr or lower by contacting the lactic acid oligomer with a depolymerization catalyst such as antimony trioxide or tin octylate. The gaseous lactide produced by this reaction is fed to lower distillation column 12.

In the lower distillation column 12, impurities such as oligomer contained in lactide is liquefied by cooling the gaseous lactide and the gaseous lactide is sent to upper distillation column 13. In the liquid containing oligomer separated from lactide, in many cases, the molecular weight of the oligomer becomes lower due to the depolymerization reaction. In order to improve the yield of lactide, it is preferred to condense again the oligomer of low molecular weight to increase the molecular weight, and, therefore, the liquid containing the oligomer of low molecular weight separated from lactide is refluxed to the concentrated lactic acid buffer tank 5.

The gaseous lactide is cooled and condensed in the upper distillation column 13 and then fed to lactide purification device 15. The gas containing a large amount of water vapor separated from lactide enters into cooling device 24, where lactic acid, lactic acid oligomer of low molecular weight and lactide are removed from the gas and refluxed to the upper distillation column 13.

The vapor which is not condensed in the cooling device 24 enters into impurity cooler 25 and is condensed and liquefied here. The liquefied impurities are usually abandoned. The gas which is not condensed in the impurity cooler 25 is discharged out of the system through a vacuum pump 26.

The lactide discharged from lactide purification device 15 is transferred to opening ring polymerization device 17. In the opening ring polymerization device 17, the opening ring polymerization reaction of lactide proceeds. The reaction is carried out at a temperature of 120-250° C. under a reduced pressure of 10 torr or lower by contacting the lactide with an opening ring polymerization catalyst such as antimony trioxide or tin octylate and a polymerization initiator such as 1-dodecanol. When the concentration of the polymerization initiator is 700 ppm, the weight-average molecular weight of polylactic acid is about 200000.

Crude lactide was produced by the apparatus of this example. The oligomer used in this experiment had an average molecular weight of 630. The retention time of oligomer in the depolymerization device 11 was 5 hours, thickness of the liquid film was 5 cm, and increase of optical isomerization rate in the depolymerization step was 0.9% in the case of the concentration of the catalyst (tin 2-ethylhexanoate) being 0.7 kg/m$^3$. Here, the retention time of the oligomer is defined to be a ratio of a feed flow rate of molten oligomer and a retention amount of molten oligomer in the oligomer depolymerization device 11 when the feed flow rate of the molten oligomer and the flow rate of vapor condensate discharged from the depolymerization reactor are equal, and when the thickness of liquid film is stabilized. Furthermore, coloration of polylactic acid obtained by opening ring polymerization of the lactide is 2.5 in terms of value b, and thus the influence of heat decomposition of lactide and oligomer in depolymerization is small.

As a comparative example, depolymerization of the same oligomer as in the embodiment shown in FIG. 1 was carried out in batch-wise manner using a conventional tank type reaction vessel. In this experiment, the depolymerization was carried out under the conditions of a depolymerization time of 10 hours, an initial liquid level of 80 cm, and an initial catalyst concentration of 5 kg/m$^3$. As a result, for the resulting lactide, increase of optical isomerization rate in the depolymerization step was 9%, and coloration of polylactic acid obtained by opening ring polymerization using the lactide was 4.4 in terms of value b.

The apparatus in each example is usable in preliminary step of depolymerization or polycondensation step, and applicable to hydroxy carboxylic acids such as glycolic acid other than lactic acid.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

According to the present invention, a glycolic acid oligomer less in impurities can be obtained in a short time by carrying out polycondensation reaction of glycolic acid using a centrifugal flow thin film evaporator as a depolymerization device.

The invention claimed is:

1. A method for producing a polyhydroxy carboxylic acid which comprises producing a polycondensate by polycondensation reaction by heating a hydroxy carboxylic acid or a polycondensate thereof under reduced pressure by a polycondensation device, introducing the polycondensate produced by the polycondensation device into a depolymerization device from a feed opening for the polycondensate provided at a casing of the depolymerization device, forming a liquid film by a rotating blade rotating inside the casing about a rotary shaft, heating the liquid film by a heating part to depolymerize it into an annular dimer, discharging the annular dimer from an annular dimer discharge opening formed at the casing, introducing the annular dimer vaporized in the depolymerization device into a lower distillation column provided between the depolymerization device and a condenser for condensing the annular dimer vaporized by the depolymerization device, separating the polycondensate from the annular dimer and refluxing the polycondensate, wherein the shape of the blade is formed so that an outer diameter of the rotating blade equivalent to the diameter of rotation of the rotating blade as measured perpendicular to the rotary shaft gradually decreases from a larger outer diameter of the blade to a smaller outer diameter of the blade relative to the larger outer diameter, and the casing is formed so as to have an inner wall parallel with the outer shape of the blade, and wherein a feed opening is formed at the casing on the side of the larger outer diameter of the rotating blade, a discharge opening through which the annular dimer is discharged is formed at a first part of the casing on the side of the smaller outer diameter of the rotating blade, and a drain opening is formed at a second part of the casing on the side of the smaller outer diameter of the rotating blade and opposed to the first part of the casing with respect to the rotary shaft.

2. A method for producing a polyhydroxy carboxylic acid according to claim 1, wherein the polycondensate is refluxed to at least one of a hydroxy carboxylic acid concentration device for concentrating the hydroxy carboxylic acid, the polycondensation device for carrying out the polycondensation reaction of the concentrated hydroxy carboxylic acid and a buffer tank provided between the polycondensation device and the depolymerization device, said concentration device, polycondensation device and buffer tank being provided before the depolymerization device.

3. A method for producing a polyhydroxy carboxylic acid according to claim 1, wherein the hydroxy carboxylic acid is lactic acid, the polycondensate is a lactic acid oligomer, and the annular dimer is lactide.

4. A method for producing a polyhydroxy carboxylic acid according to claim 1, wherein the hydroxy carboxylic acid is lactic acid, and the annular dimer is lactide.

* * * * *